US008514347B2

(12) United States Patent
Kim et al.

(10) Patent No.: US 8,514,347 B2
(45) Date of Patent: Aug. 20, 2013

(54) BACKLIGHT UNIT AND LIQUID CRYSTAL DISPLAY INCLUDING THE SAME

(75) Inventors: Youngsam Kim, Kyungbuk (KR); Hyunsoo Kim, Kyungbuk (KR)

(73) Assignee: LG Display Co., Ltd., Seoul (KR)

( * ) Notice: Subject to any disclaimer, the term of this patent is extended or adjusted under 35 U.S.C. 154(b) by 72 days.

(21) Appl. No.: 13/253,215

(22) Filed: Oct. 5, 2011

(65) Prior Publication Data
US 2012/0133857 A1    May 31, 2012

(30) Foreign Application Priority Data

Nov. 26, 2010  (KR) .................. 10-2010-0118819
Aug. 12, 2011  (KR) .................. 10-2011-0080412

(51) Int. Cl.
*G02F 1/1335* (2006.01)
*F21V 9/00* (2006.01)
*F21V 7/04* (2006.01)

(52) U.S. Cl.
USPC .............. 349/64; 349/69; 362/293; 362/606

(58) Field of Classification Search
USPC ......... 349/106, 108, 64, 65, 62, 69; 362/608, 362/242, 293, 231, 606
See application file for complete search history.

(56) References Cited

U.S. PATENT DOCUMENTS

| 7,597,467 | B2 * | 10/2009 | Itaya ............................. 362/601 |
| 2002/0167630 | A1 * | 11/2002 | Fujieda et al. ................ 349/117 |
| 2003/0064301 | A1 * | 4/2003 | Chari et al. ....................... 430/7 |
| 2007/0263409 | A1 * | 11/2007 | Mok .............................. 362/612 |
| 2009/0147174 | A1 * | 6/2009 | Ha et al. .......................... 349/58 |
| 2011/0103094 | A1 * | 5/2011 | Nagata .......................... 362/613 |
| 2011/0109844 | A1 * | 5/2011 | Go et al. .......................... 349/65 |

* cited by examiner

*Primary Examiner* — Edward Glick
*Assistant Examiner* — Mark Teets
(74) *Attorney, Agent, or Firm* — Morgan, Lewis & Bockius LLP

(57) ABSTRACT

A backlight unit including a light guide plate, a light source comprising a plurality of color light emitting diodes, and an optical member comprising a diffusion sheet on the light guide plate, wherein the diffusion sheet comprises a plurality of color patterns that are located outside of an area that overlaps with an active area, where each of the color light emitting diodes is positioned in an area adjacent to the color pattern of a different color, and a liquid crystal display including the same are disclosed.

20 Claims, 9 Drawing Sheets

FIG. 4
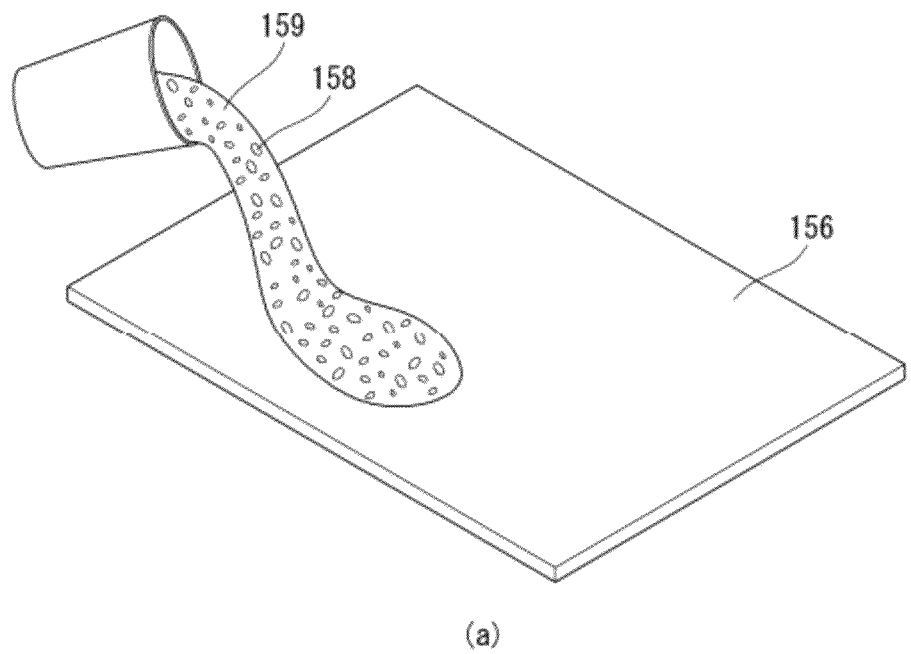
(a)
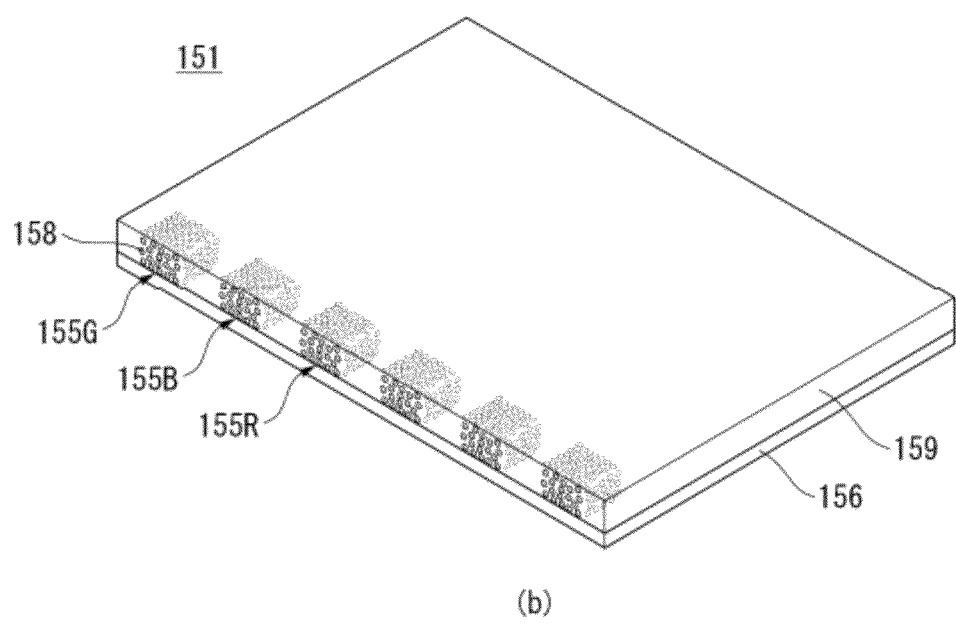
(b)

FIG. 8
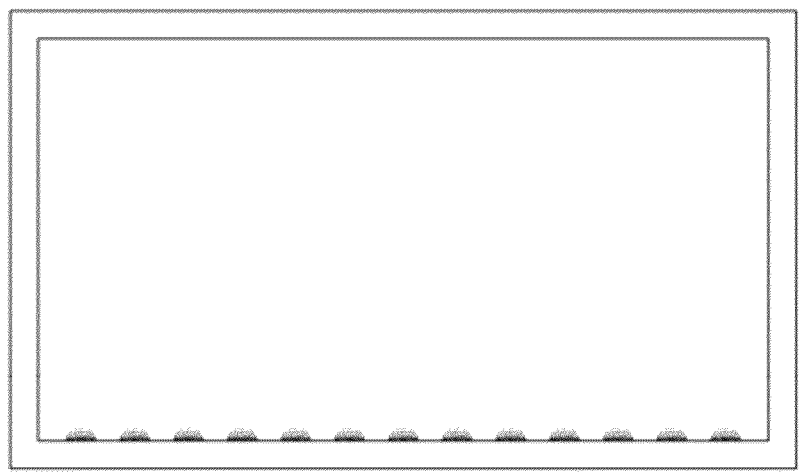
(a)
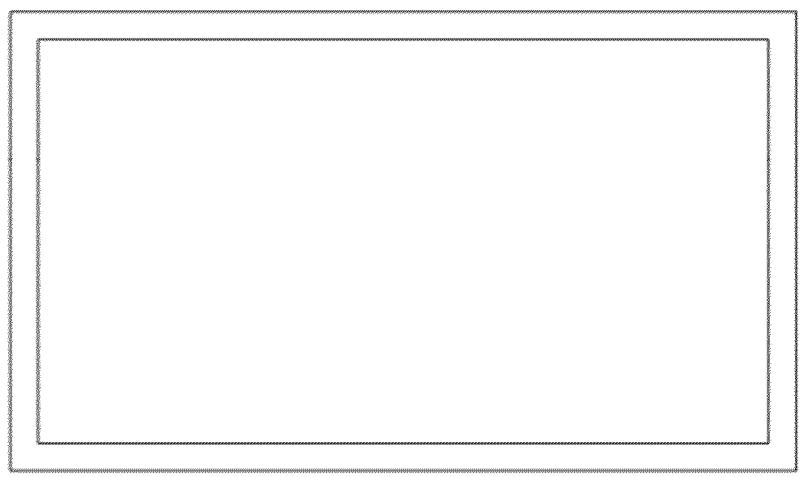
(b)

BACKLIGHT UNIT AND LIQUID CRYSTAL DISPLAY INCLUDING THE SAME

CROSS REFERENCE TO RELATED APPLICATION

This application claims the benefit of Korean Patent Application No. 10-2010-0118819 filed on Nov. 26, 2010 and No. 10-2011-0080412 filed on Aug. 12, 2011, which is incorporated herein by reference for all purposes in its entirety.

BACKGROUND OF THE INVENTION

1. Field of the Invention

Embodiments of the invention relate to a backlight unit and a liquid crystal display including the same.

2. Description of the Related Art

As various electronic devices, such as cellular phones, personal digital assistants (PDAs), and notebooks, have been recently developed, a demand for flat panel display devices having excellent characteristics, such as thin profile and light weight, which can be applied to the various electronic devices, has gradually increased. Some examples of the flat panel display devices include a liquid crystal display (LCD), a plasma display panel (PDP), and an organic light emitting diode (OLED) display. These LCDs, PDPs, and OLED displays have been actively studied. In particular, the LCD among the flat panel display devices has been spotlighted because of its capability for mass production, its simple driving elements, and its high-definition.

The LCD, which is a light receiving display, includes a LCD panel displaying an image and a backlight unit, which is disposed under the LCD panel and provides light to the LCD panel.

FIG. 1 illustrates an LCD in related art.

As shown in FIG. 1, an LCD 10 in related art includes a light source 11 providing light, a light guide plate 15 guiding the light provided by the light sources 11, and a diffusion sheet 18 positioned on the light guide plate 15.

The light source 11 includes a red light emitting diode 12R, a green light emitting diode 12G, and a blue light emitting diode 12B. Red light, green light, and blue light, which are emitted from the red, green, and blue light emitting diodes 12R, 12G, and 12B, respectively, are incident on the light guide plate 15, and at the same time, are mixed with one another, thereby generating white light.

However, in the related art LCD, the red light, the green light, and the blue light incident on the light guide plate 15 are not completely mixed with one another in an area adjacent to the light source 11. As a result, clear white light is not visible, and the red light, the green light, and the blue light are visible in the light guide plate 15.

Accordingly, the quality of a related art backlight unit including the light sources 11 providing the white light is reduced, and the image quality of the related art LCD is reduced.

SUMMARY OF THE INVENTION

Embodiments of the invention provide a backlight unit and a liquid crystal display (LCD) including the same capable of improving the quality of the mixed light of red light, green light, and blue light emitted from a light source.

A backlight unit according to some embodiments of the present invention includes a light guide plate; a light source including a plurality of color light emitting diodes; and an optical member including a diffusion sheet on the light guide plate, wherein the diffusion sheet comprises a plurality of color patterns that are located outside of an area that overlaps with an active area, wherein each of the color light emitting diodes is positioned in an area adjacent to the color pattern of a different color. The plurality of color light emitting diodes may be red, green, and blue light emitting diodes, and the plurality of color patterns may be red, green, and blue patterns.

In some embodiments, the color patterns may comprise color inks or fluorescence materials. Moreover, the color patterns can be formed on the surface of the diffusion sheet or inside the diffusion sheet where the color patterns optionally include beads coated with color inks or fluorescence materials.

In additional embodiments, the color pattern may have a solid color pattern or can be formed of a plurality of dots, and the dots have circle, square, or hexagon shapes.

In yet additional embodiments, each of the color patterns may have a square or trapezoid shape. Specifically, when the color patterns have the trapezoid shape, a short side of each of the trapezoid-shaped color patterns may be positioned adjacent to the color light emitting diodes, and a long side thereof may be positioned away from the color light emitting diodes.

In further embodiments, the color depth within the color patterns may decrease as the distance from the light emitting diode increases.

In yet further embodiments, the diffusion sheet may further include a light shielding line, the light source may further include a light emitting diode printed circuit board, and/or the optical member may further include a focusing sheet. Moreover, the backlight unit may further include a reflective plate.

The invention according to other embodiments of the present invention also relates to a liquid crystal display (LCD) including an LCD panel and the backlight unit described herein. The LCD panel described herein may include a first substrate on which a plurality of scan lines and a plurality of data lines are formed to cross each other in a matrix form; a second substrate on which color filters, black matrixes, transparent common electrodes covering the color filters and the black matrixes are formed; a printed circuit board; and a connection member connected to the printed circuit board and one or more side(s) of the first substrate where the first and second substrates are facing each other with a liquid crystal layer interposed therebetween.

In some embodiments, the printed circuit board may be a flexible printed circuit board, and the connection member is a tape carrier package.

In further embodiments, the LCD may further include a cover bottom; a panel guide that surrounds an edge of the LCD panel; and a top cover that surrounds the panel guide and is fastened to the cover bottom.

BRIEF DESCRIPTION OF THE DRAWINGS

The accompanying drawings are included to provide a further understanding of the invention and are incorporated in and constitute a part of this specification. The drawings illustrate embodiments of the invention and together with the description serve to explain the principles of the invention. In the drawings:

FIG. 4 illustrates a method for manufacturing a diffusion sheet according to one exemplary embodiment of the invention;

FIG. 8 illustrates a comparison between a driving operation of a related art backlight unit and a driving operation of a backlight unit according to one exemplary embodiment of the invention.

DETAILED DESCRIPTION OF THE EMBODIMENTS

Reference will now be made in detail to the specific embodiments of the present invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the present invention Exemplary embodiments of the present invention will be described with reference to FIGS. 2 to 8.

Figure 1:
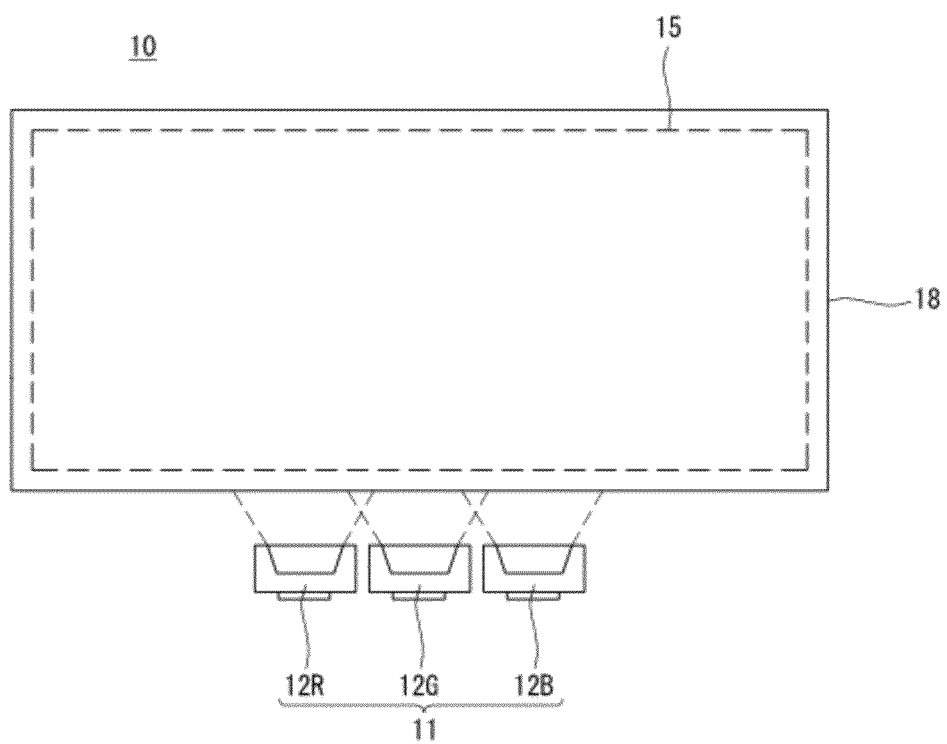
FIG. 1 illustrates an LCD in related art.
Figure 2:
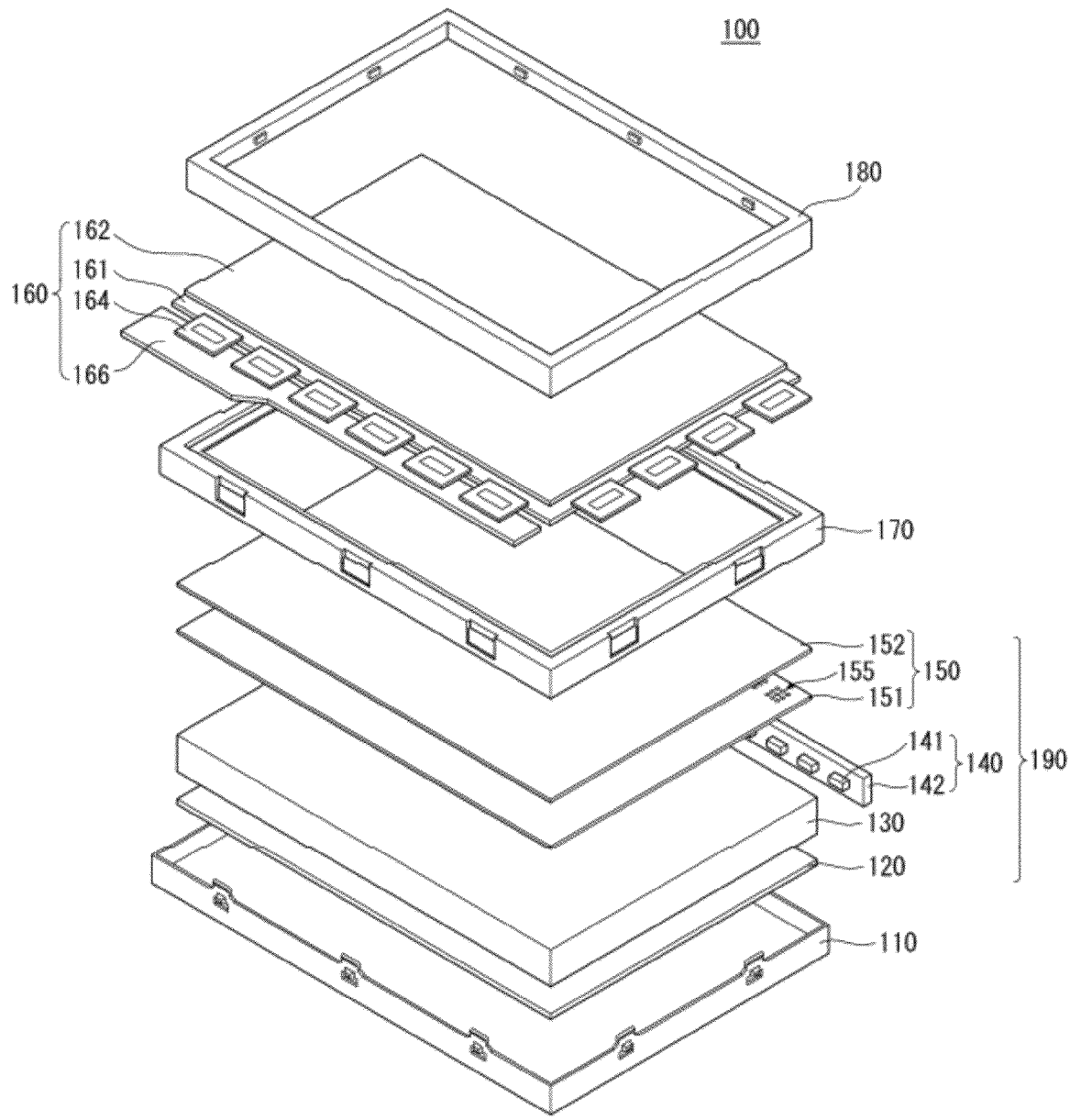
FIG. 2 is an exploded perspective view of an LCD according to one exemplary embodiment of the invention.

FIG. 2 is an exploded perspective view of an LCD according to one exemplary embodiment of the invention.

As shown in FIG. 2, an LCD 100 according to one exemplary embodiment of the invention may include a cover bottom 110, a reflective plate 120 positioned on the cover bottom 110, a light guide plate 130 positioned on the reflective plate 120, a light source 140 positioned on the side of the light guide plate 130, an optical member 150 positioned on the light guide plate 130, a LCD panel 160 positioned on the optical member 150, a panel guide 170 surrounding an edge of the LCD panel 160, and a top cover 180 which surrounds the panel guide 170 and is fastened to the cover bottom 110.

Referring to FIG. 2, the cover bottom 110 and the top cover 180 serve as a case of the LCD 100. Thus, the cover bottom 110 and the top cover 180 may incorporate the LCD panel 160 and a backlight unit 190, which includes the reflective plate 120, the light guide plate 130, the light source 140, and the optical member 150, and are fastened to each other. The cover bottom 110, for example, may have a rectangular plate shape, and the top cover 180 may have a rectangular frame shape.

The reflective plate 120 positioned on the cover bottom 110 can reflect forward light emitted from the light guide plate 130. Thus, the reflective plate 120 may be formed of a metal having an excellent reflectance.

The light guide plate 130 positioned on the reflective plate 120 can guide light emitted from the light source 140 and can change a line light source to a surface light source. In particular, the light guide plate 130 may be formed of a material having an excellent total reflectance, for example, polymethyl methacrylate (PMMA).

According to the exemplary embodiment shown in FIG. 2, at least one light source 140 may be formed on one side of the light guide plate 130 along a long or short axis direction of the light guide plate 130. Alternatively, at least one light source 140 may be formed on each of both long or short sides or on all four sides of the light guide plate 130. Light emitted from the light source 140 may be directly incident on the light guide plate 130. Alternatively, the light emitted from the light source 140 may be reflected on a light source housing (not shown), which surrounds a portion of the light source 140, for example, about ¾ of an outer circumference surface of the light source 140, and then may be incident on the light guide plate 130.

In some embodiments, the light source 140 may have a configuration in which a plurality of light emitting diodes (LEDs) 141 are arranged on a light emitting diode (LED) printed circuit board (PCB) 142. In further embodiments, a reflective plate (not shown) may be positioned on the LED PCB 142 and may reflect light emitted from the LEDs 141.

The above embodiments of the present invention describe the LEDs as an example of the light source 140, but are not limited thereto. For example, a cold cathode fluorescent lamp (CCFL), a hot cathode fluorescent lamp (HCFL), and/or an external electrode fluorescent lamp (EEFL) may be used for the light source 140. Other kinds of the light source 140 may be used.

Referring to FIG. 2, the optical member 150 positioned on the light guide plate 130 may diffuse and focus the light emitted from the light guide plate 130. The optical member 150 may include a diffusion sheet 151 and a focusing sheet 152 in any order, and either the diffusion sheet or the focusing sheet can be placed closer to the light guide plate. The diffusion sheet 151 can diffuse the light emitted from the light guide plate 130 and can uniformize a luminance of the light. The diffusion sheet 151 may include a plurality of color patterns 155. The focusing sheet 152 may be formed of at least one of a prism sheet, a microlens sheet, and a lenticular lens sheet. The focusing sheet 152 can focus the light emitted from the light guide plate 130 and can improve the luminance of the light.

In some embodiments, the color pattern may be formed along one or more axis directions of the diffusion sheet corresponding with the location(s) of the light source(s) described herein.

The LCD panel 160 positioned on the optical member 150 can display an image. The LCD panel 160 may include a first substrate 161 and a second substrate 162, which are facing each other with a liquid crystal layer (not shown) interposed therebetween and are attached to each other. Although it is not shown, a plurality of scan lines and a plurality of data lines may be arranged to cross each other in a matrix form on the first substrate 161 called a thin film transistor (TFT) array substrate, thereby defining a plurality of pixels. Each pixel may include a TFT capable of turning on or off a signal and a pixel electrode connected to the TFT.

Red, green, and blue color filters corresponding to each pixel, black matrixes, transparent common electrodes covering the red, green, and blue color filters and the black matrixes, etc. may be formed on the second substrate 162 called a color filter substrate. The black matrixes surround the red, green, and blue color filters and cover non-display elements, such as the scan lines, the data lines, and the TFTs.

As shown in FIG. 2, a printed circuit board 166 is connected to at least one side of the LCD panel 160 through a connection member 164, such as a flexible printed circuit board and a tape carrier package (TCP). Hence, the LCD panel 160 may be disposed close to the side of the panel guide 170 and a bottom surface of the cover bottom 110 in a module process.

In the LCD panel 160 having the above-described structure according to the exemplary embodiment shown in FIG. 2, when the TFT corresponding to each scan line is turned on in response to an ON or OFF signal supplied by a gate driving circuit through the scan lines, a data voltage of a data driving circuit is supplied to the corresponding pixel electrode through the data lines. Hence, an orientation direction of liquid crystal molecules changes by an electric field between the pixel electrode and the common electrode, and a transmittance difference may be generated.

The panel guide 170 surrounding the edge of the LCD panel 160 can stably incorporate the LCD panel 160 and can support the LCD panel 160.

Accordingly, the LCD 100 according to the exemplary embodiment of the invention may be configured to incorporate the backlight unit 190 and the LCD panel 160.

Figure 3:
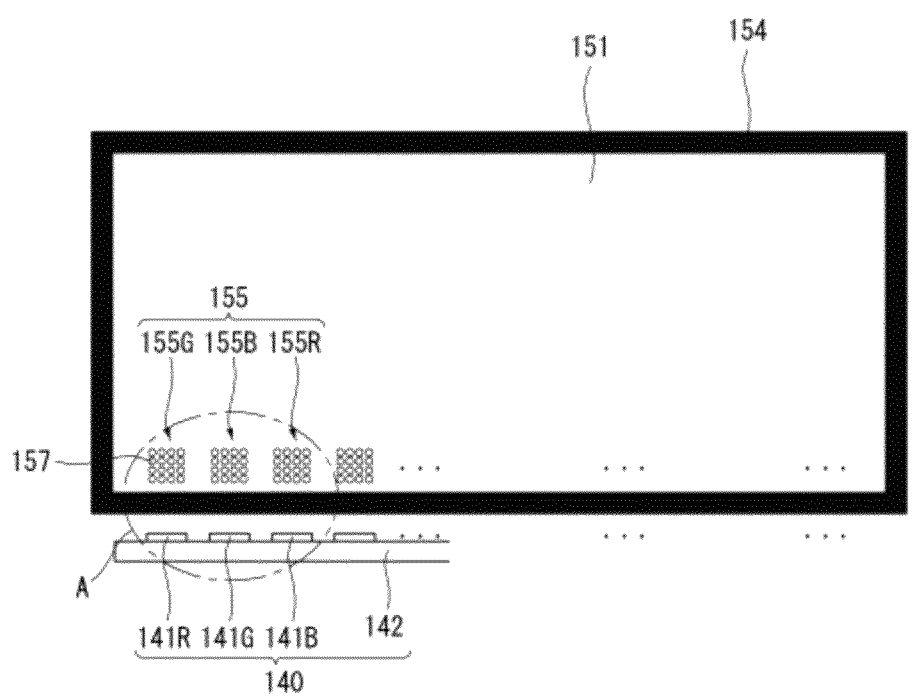
FIG. 3 is a plane view of a backlight unit according to one exemplary embodiment of the invention.
Figure 5:
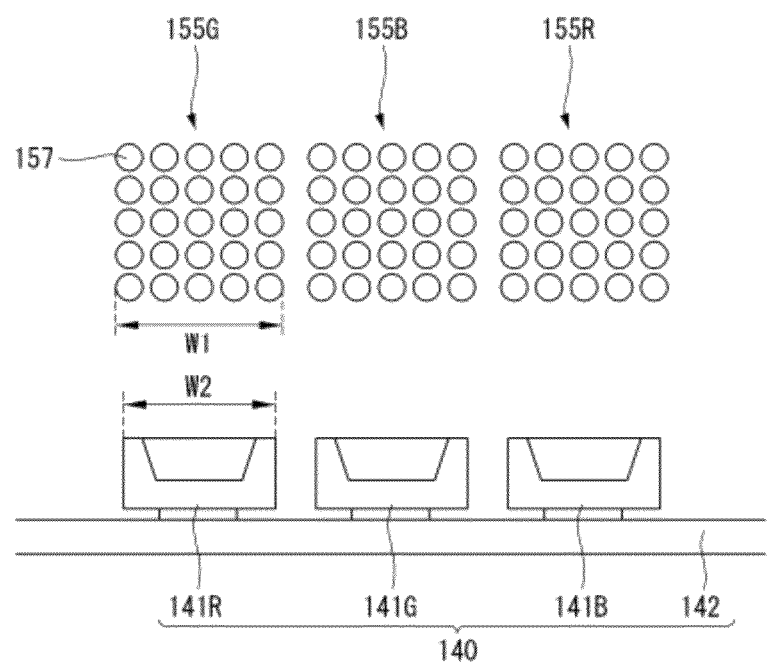
FIG. 5 is an enlarged view of an area A of FIG. 3.

FIG. 3 is a plane view of the exemplary backlight unit 190 shown in FIG. 2. FIG. 4 illustrates one method for manufacturing the diffusion sheet 151. FIG. 5 is an enlarged view of an area A of FIG. 3. FIG. 3 shows only the diffusion sheet 151 and the light source 140 so as to clearly illustrate the characteristics of the embodiment of the invention. Further, FIG. 5 also shows only the light source 140 and the color patterns 155 so as to clearly illustrate the characteristics of the embodiment of the invention.

As shown in FIGS. 2 and 3, the diffusion sheet 151 is positioned directly or indirectly on the light guide plate 130 and can diffuse light when the light provided by the light source 140 is emitted from the light guide plate 130.

According to the exemplary embodiment shown in FIG. 3, the diffusion sheet 151 includes a light shielding line 154 surrounding all of edges of an upper surface of the diffusion sheet 151. The light shielding line 154 can prevent the light emitted from the light guide plate 130 from being leaked to the outside. The light shielding line 154 may include a black dye and may be formed of a material capable of absorbing light.

The plurality of color patterns 155 of the diffusion sheet 151 may be formed on the surface of the diffusion sheet 151 or may be formed inside the diffusion sheet 151. When the color patterns 155 are formed at one edge of the diffusion sheet 151, each of the color patterns may include a plurality of dot patterns 157 formed of red, green, or blue inks or fluorescence materials. For example, the color patterns 155 include red patterns 155R formed of the red ink, green patterns 155G formed of the green ink, and blue patterns 155B formed of the blue ink.

A color pattern used herein may include a plurality of dot patterns (described below), a solid color pattern comprising the color ink or fluorescent material described herein, and any variation thereof.

A dot pattern used herein refers to a pattern of a two dimensional or three dimensional dot comprising the color ink or fluorescent material described herein. A dot pattern 157 in a color pattern may have various shapes, such as a circle, sphere, or rod shape, a square or cube shape, and a hexagon shape. In some embodiments, the dot pattern 157 may have the hexagon shape. When the dot pattern 157 has the hexagon shape, a plurality of dot patterns can be spaced apart from one another at a uniform distance. Hence, red light, green light and blue light may be uniformly mixed with one another.

Further, as shown in FIG. 4, when the plurality of color patterns 155 are formed inside the diffusion sheet 151, the color patterns 155 include a plurality of beads 158 coated with red, green, and blue inks or fluorescence materials. More specifically, as shown in FIG. 4(a), a resin 159 mixed with the plurality of beads 158 is coated on a PET film 156. Next, as shown in FIG. 4(b), the resin 159 is cured to form the red patterns 155R, the green patterns 155G, and the blue patterns 155B inside the diffusion sheet 151.

As shown in FIG. 3, the plurality of color patterns 155 are positioned inside the light shielding line 154 of the diffusion sheet 151. The light source 140 is positioned in an area adjacent to the color patterns 155 of the diffusion sheet 151. The light source 140 includes a red light emitting diode 141R, a green light emitting diode 141G, a blue light emitting diode 141B, and optionally a LED PCB.

More specifically, as shown in FIG. 5, the green pattern 155G can be positioned in an area corresponding to the red light emitting diode 141R, the blue pattern 155B can be positioned in an area corresponding to the green light emitting diode 141G, and the red pattern 155R can be positioned in an area corresponding to the blue light emitting diode 141B. Accordingly, each of the color light emitting diodes is positioned in an area adjacent to the color pattern of a different color.

In additional embodiments, the blue pattern 155B can be positioned in an area corresponding to the red light emitting diode 141R, the red pattern 155R can be positioned in an area corresponding to the green light emitting diode 141G, and the green pattern 155G can be positioned in an area corresponding to the blue light emitting diode 141B. In further embodiments, other color patterns and/or corresponding other color light emitting diodes can be employed. For example, the cyan pattern can be positioned in an area corresponding to the red light emitting diode, the magenta pattern can be positioned in an area corresponding to the green light emitting diode 141G, and the yellow pattern can be positioned in an area corresponding to the blue light emitting diode 141B.

According to the exemplary arrangement illustrated in FIG. 5, red light emitted from the red light emitting diode 141R is implemented as yellow light through the green pattern 155G, green light emitted from the green light emitting diode 141G is implemented as cyan light through the blue pattern 155B, and blue light emitted from the blue pattern 155B is implemented as magenta light through the red pattern 155R. Hence, the yellow light, the cyan light, and the magenta light are mixed with one another in the light guide plate, thereby implementing white light.

Widths W1 of the red, green, and blue patterns 155R, 155G, and 155B as shown in FIG. 5 may be substantially equal to or greater than widths W2 of the red, green, and blue light emitting diodes 141R, 141G, and 141B, respectively. If the widths W1 of the red, green, and blue patterns 155R, 155G, and 155B are less than the widths W2 of the red, green, and blue light emitting diodes 141R, 141G, and 141B, respectively, light emitted from the red, green, and blue light emitting diodes 141R, 141G, and 141B is emitted between the red, green, and blue patterns 155R, 155G, and 155B. Hence, red, green, and blue light may be visible.

Each of the red, green, and blue patterns 155R, 155G, and 155B may have various shapes.

Figure 6A:
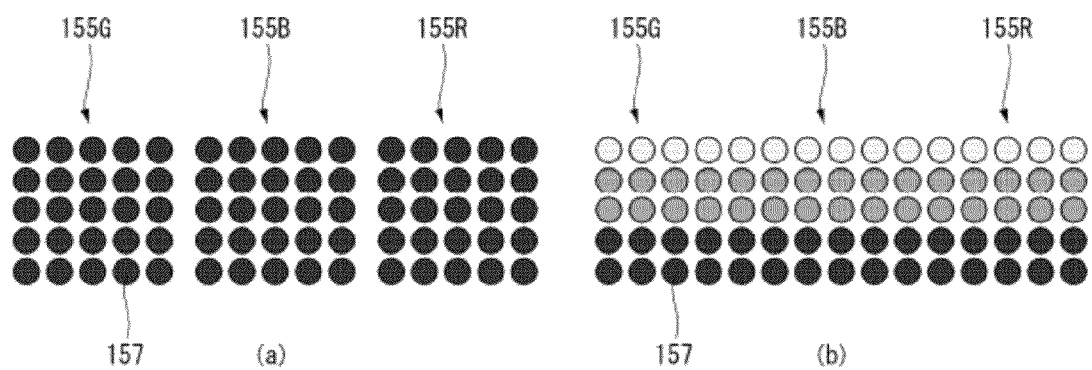
FIGS. 6A to 6F illustrate shapes of red, green, and blue patterns according to some exemplary embodiments of the invention.
Figure 6B:
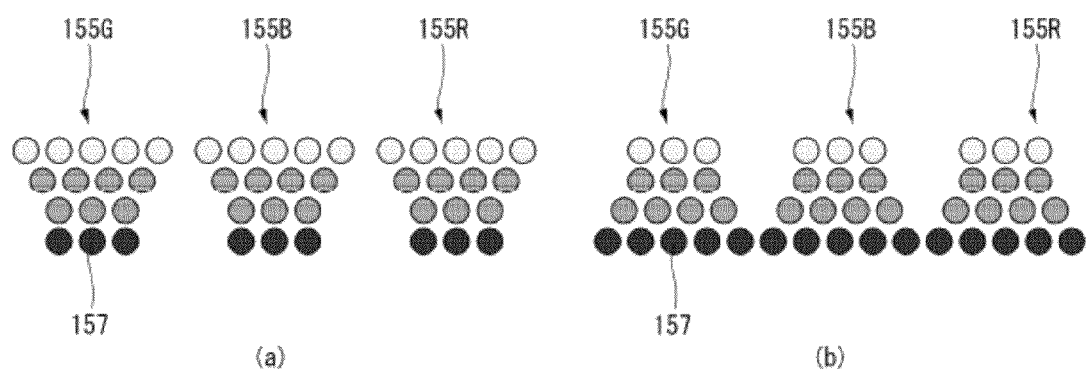
Figure 6C:
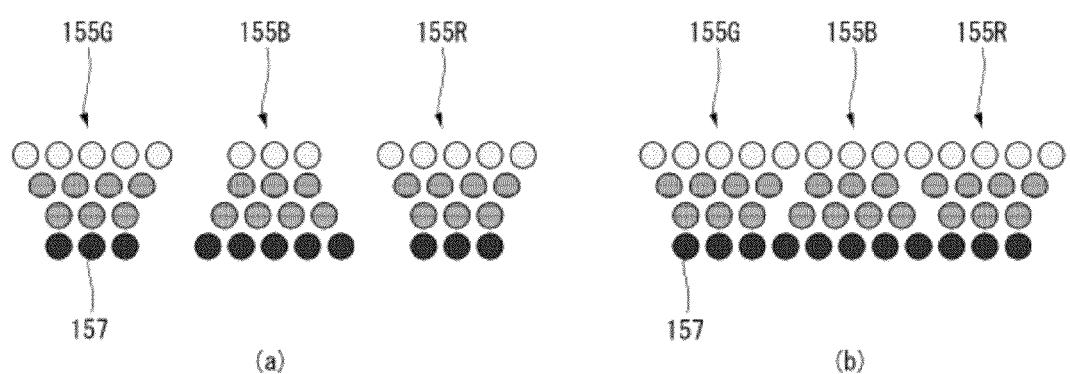
Figure 6D:
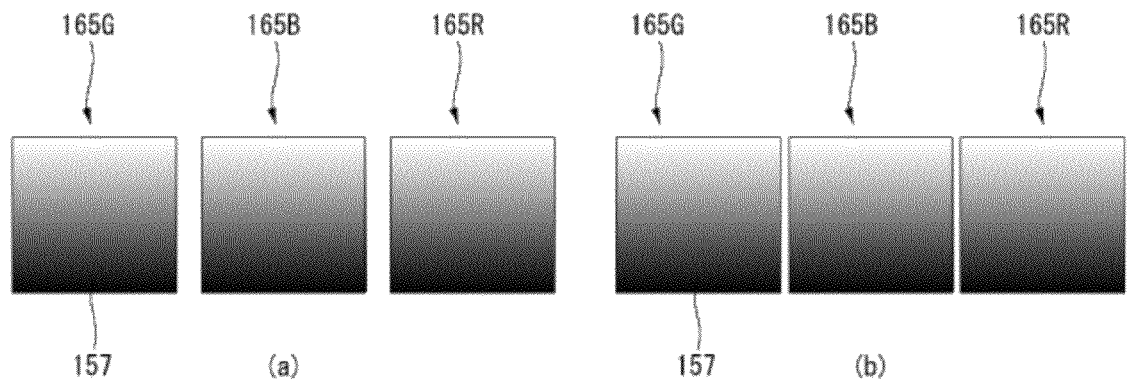
Figure 6E:
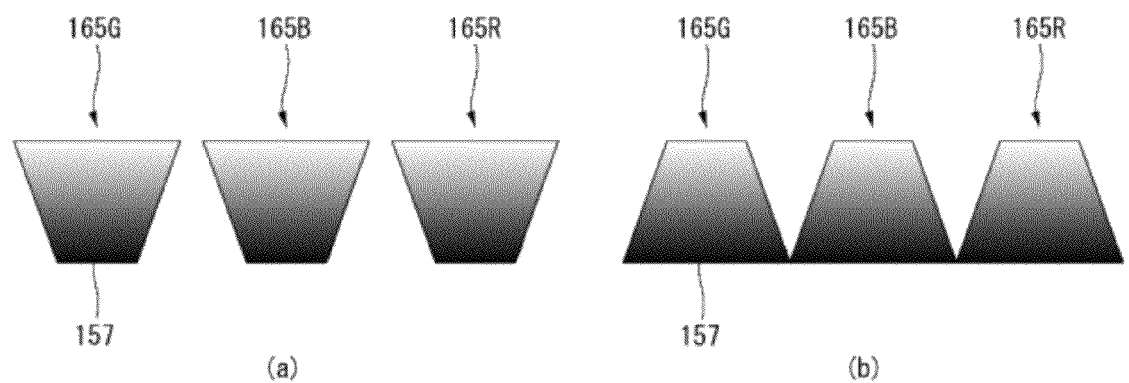
Figure 6F:
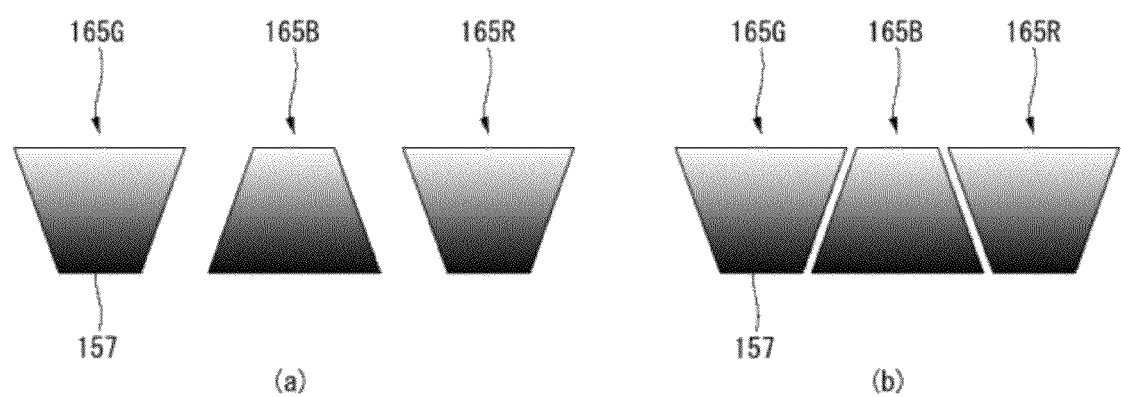

FIGS. 6A to 6C illustrate various shapes of the red, green, and blue patterns 155R, 155G, and 155B comprising dot patterns. FIGS. 6D to 6F illustrate various shapes of the red, green, and blue patterns 165R, 165G, and 165B comprising solid color patterns.

As shown in FIG. 6A(a), each of the red, green, and blue patterns 155R, 155G, and 155B may have a square shape, so as to efficiently mix light from the red, green, and blue light emitting diodes, respectively. Further, the red, green, and blue patterns 155R, 155G, and 155B may be positioned to be spaced apart from one another. A color depth of the dot patterns 157 constituting each of the red, green, and blue patterns 155R, 155G, and 155B may be uniform.

Alternatively, as shown in FIG. 6A(b), the red, green, and blue patterns 155R, 155G, and 155B may be positioned close to one another. A color depth of the dot patterns 157 constituting each of the red, green, and blue patterns 155R, 155G, and 155B may decrease as the dot patterns 157 go away from the red, green, and blue light emitting diodes. Accordingly, the color depth within the color patterns decrease as the distance from the light emitting diode increases. This is because as a travel distance of light emitted from the red, green, and blue light emitting diodes increases, a luminance of the light decreases. Thus, the arrangement illustrated in FIG. 6A(b) may balance the luminance of the light.

Alternatively, as shown in FIG. 6B(a), each of the red, green, and blue patterns 155R, 155G, and 155B may have a trapezoid shape. A short side of each of the trapezoid-shaped red, green, and blue patterns 155R, 155G, and 155B may be positioned adjacent to the red, green, and blue light emitting diodes, respectively, and a long side thereof may be positioned away from the red, green, and blue light emitting diodes. This is because light emitted from the red, green, and blue light emitting diodes is widely diffused at an orientation angle of about 120°. Thus, the shape illustrated in FIG. 6B(a) may cover the orientation angle of the light. Further, the red, green, and blue patterns 155R, 155G, and 155B may be positioned to be spaced apart from one another.

Alternatively, as shown in FIG. 6B(b), a long side of each of trapezoid-shaped red, green, and blue patterns 155R, 155G, and 155B may be positioned adjacent to the red, green, and blue light emitting diodes, respectively, and a short side thereof may be positioned away from the red, green, and blue light emitting diodes. Further, the red, green, and blue patterns 155R, 155G, and 155B may be positioned close to one another. In particular, as shown in FIG. 6B(b), the different color dots in the far most side of the color patterns adjacent to the light emitting diodes can be spaced apart from one another at a uniform distance.

Alternatively, as shown in FIG. 6C(a), each of the red, green, and blue patterns 155R, 155G, and 155B may have a trapezoid shape. The trapezoid-shaped patterns and the inverted trapezoid-shaped patterns may be alternately positioned. Namely, a short side of the trapezoid-shaped green pattern 155G may be positioned adjacent to the red, green, and blue light emitting diodes, and a long side of the trapezoid-shaped blue pattern 155B may be positioned adjacent to the red, green, and blue light emitting diodes. Further, the red, green, and blue patterns 155R, 155G, and 155B may be positioned to be spaced apart from one another.

Alternatively, as shown in FIG. 6C(b), the red, green, and blue patterns 155R, 155G, and 155B may be positioned close to one another.

As shown in FIG. 6D(a), each of the red, green, and blue patterns 165R, 165G, and 165B may have a square shape, so as to efficiently mix light from the red, green, and blue light emitting diodes. Further, the red, green, and blue patterns 165R, 165G, and 165B may be positioned to be spaced apart from one another. A color depth of the solid color patterns 165R, 165G, and 165B may be uniform.

Alternatively, as shown in FIG. 6D(b), the red, green, and blue patterns 165R, 165G, and 165B may be positioned close to one another. A color depth of the solid color patterns 165R, 165G, and 165B may decrease as the solid color patterns go away from the red, green, and blue light emitting diodes, respectively. Accordingly, the color depth within the color patterns decrease as the distance from the light emitting diode increases.

Alternatively, as shown in FIG. 6E(a), each of the red, green, and blue patterns 165R, 165G, and 165B may have a trapezoid shape. A short side of each of the trapezoid-shaped red, green, and blue patterns 165R, 165G, and 165B may be positioned adjacent to the red, green, and blue light emitting diodes, respectively, and a long side thereof may be positioned away from the red, green, and blue light emitting diodes, respectively.

Alternatively, as shown in FIG. 6E(b), a long side of each of trapezoid-shaped red, green, and blue patterns 165R, 165G, and 165B may be positioned adjacent to the red, green, and blue light emitting diodes, respectively, and a short side thereof may be positioned away from the red, green, and blue light emitting diodes. Further, the red, green, and blue patterns 165R, 165G, and 165B may be positioned close to one another.

Alternatively, as shown in FIG. 6F(a), each of the red, green, and blue patterns 165R, 165G, and 165B may have a trapezoid shape. The trapezoid-shaped patterns and the inverted trapezoid-shaped patterns may be alternately positioned. Namely, a short side of the trapezoid-shaped green pattern 165G may be positioned adjacent to the red, green, and blue light emitting diodes, and a long side of the trapezoid-shaped blue pattern 165B may be positioned adjacent to the red, green, and blue light emitting diodes. Further, the red, green, and blue patterns 165R, 165G, and 165B may be positioned to be spaced apart from one another.

Alternatively, as shown in FIG. 6F(b), the red, green, and blue patterns 165R, 165G, and 165B may be positioned close to one another.

The red, green, and blue patterns 155R, 155G, 155B, 165R, 165G, and 165B are not limited to the shapes and the arrangements illustrated in FIGS. 6A to 6F. Other shapes and arrangements may be used as long as light emitted from the light source can be efficiently mixed with one another.

Figure 7:
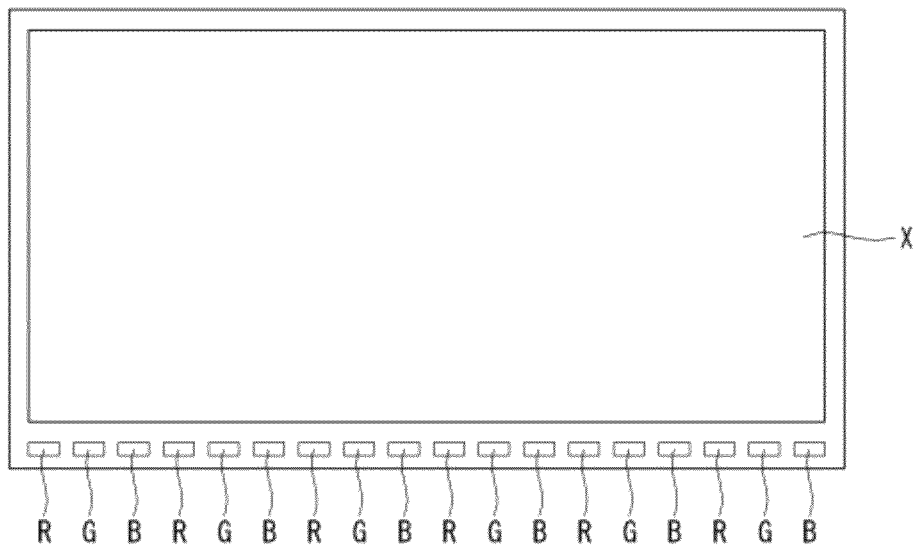
FIG. 7 illustrates a diffusion sheet manufactured according to one exemplary embodiment of the invention.

FIG. 7 illustrates the diffusion sheet manufactured according to an exemplary embodiment of the invention. R, G, B in the figure refers to red, green and blue color patterns. In further embodiments, these color patterns are located outside of the area (X) that overlaps with the active area as shown in FIG. 7.

FIG. 8 illustrates a comparison between a driving operation of a related art backlight unit without any color pattern in its diffusion sheet and a driving operation of the backlight unit according to the example embodiment of the invention.

The backlight unit according to the exemplary embodiment of the present invention and the related art backlight unit are driven, and the quality of the mixed light of red light, green light, and blue light is determined.

As shown in FIG. 8(a), in the related art backlight unit not including a color pattern, red light, green light, and blue light are visible from mixed light in an area adjacent to a light source, and thus the quality of the mixed light was bad.

On the other hand, in the backlight unit including the diffusion sheet including a color pattern(s) (i.e., manufactured according to the embodiment of the invention), as shown in FIG. 8(b), red light, green light, and blue light were not visible from the mixed light in the area adjacent to the light source.

In particular, in the backlight unit according to the embodiment of the invention, red light, green light, and blue light emitted from the light source may respectively converted into yellow light, cyan light, and magenta light by the use of the diffusion sheet including a color pattern(s). Hence, the yellow light, the cyan light, and the magenta light may be easily mixed with one another, thereby generating white light. As a result, the quality of the mixed light (i.e., the white light) was not excellent.

Accordingly, the embodiment of the invention may provide the backlight unit with the improved quality and the LCD including the same with the improved image quality.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
   a light guide plate;
   a light source comprising a plurality of color light emitting diodes; and
   an optical member comprising a diffusion sheet on the light guide plate, wherein the diffusion sheet comprises a plurality of color patterns that are located only outside of an area that overlaps with an active area, and the diffusion sheet diffuses a light emitted from the light guide plate,
   wherein each of the color light emitting diodes is positioned in an area adjacent to the color pattern of a different color.

2. The backlight unit according to claim 1, wherein the plurality of color light emitting diodes are red, green, and blue light emitting diodes, and the plurality of color patterns are red, green, and blue patterns.

3. The backlight unit according to claim 1, wherein the color patterns are formed on the surface of the diffusion sheet.

4. The backlight unit according to claim 1, wherein the color patterns are formed inside the diffusion sheet.

5. The backlight unit according to claim 4, wherein the color patterns comprise beads coated with color inks or fluorescence materials.

6. The backlight unit according to claim 1, wherein the color patterns comprise color inks or fluorescence materials.

7. The backlight unit according to claim 1, wherein the color pattern comprises a solid color pattern.

8. The backlight unit according to claim 1, wherein the color pattern is formed of a plurality of dots, and the dots have circle, square, or hexagon shapes.

9. The backlight unit according to claim 8, wherein the color pattern is formed of a plurality of dots, and the dots have hexagon shapes.

10. The backlight unit according to claim 1, wherein each of the color patterns has a square or trapezoid shape.

11. The backlight unit according to claim 10, wherein the color patterns have the trapezoid shape, and wherein a short side of each of the trapezoid-shaped color patterns is positioned adjacent to the color light emitting diodes, and a long side thereof is positioned away from the color light emitting diodes.

12. The backlight unit according to claim 1, wherein the color depth within the color patterns decreases as the distance from the light emitting diode increases.

13. The backlight unit according to claim 1, wherein the diffusion sheet further comprises a light shielding line.

14. The backlight unit according to claim 1, wherein the light source further comprises a light emitting diode printed circuit board.

15. The backlight unit according to claim 1, wherein the optical member further comprises a focusing sheet.

16. The backlight unit according to claim 1, wherein the backlight unit further comprises a reflective plate.

17. A liquid crystal display comprising a liquid crystal display panel (LCD panel) and the backlight unit of claim 1.

18. The liquid crystal display according to claim 17, wherein the LCD panel comprises:
   a first substrate on which a plurality of scan lines and a plurality of data lines are formed to cross each other in a matrix form;
   a second substrate on which color filters, black matrixes, transparent common electrodes covering the color filters and the black matrixes are formed;
   a printed circuit board; and
   a connection member connected to the printed circuit board and one or more side(s) of the first substrate,
   wherein the first and second substrates are facing each other with a liquid crystal layer interposed therebetween.

19. The liquid crystal display according to claim 18, wherein the printed circuit board is a flexible printed circuit board, and the connection member is a tape carrier package.

20. The liquid crystal display according to claim 17, further comprising:
   a cover bottom;
   a panel guide that surrounds an edge of the LCD panel; and
   a top cover that surrounds the panel guide and is fastened to the cover bottom.

* * * * *